(12) United States Patent
Li et al.

(10) Patent No.: US 11,218,502 B1
(45) Date of Patent: Jan. 4, 2022

(54) FEW-SHOT LEARNING BASED INTRUSION DETECTION METHOD OF INDUSTRIAL CONTROL SYSTEM

(71) Applicant: Sichuan University, Chengdu (CN)

(72) Inventors: Beibei Li, Chengdu (CN); Tao Li, Chengdu (CN); Yuankai Ouyang, Chengdu (CN); Xiaoxia Ma, Chengdu (CN); Hanyuan Huang, Chengdu (CN); Qingyun Du, Chengdu (CN)

(73) Assignee: Sichuan University, Chengdu (CN)

( * ) Notice: Subject to any disclaimer, the term of this patent is extended or adjusted under 35 U.S.C. 154(b) by 0 days.

(21) Appl. No.: 17/359,587

(22) Filed: Jun. 27, 2021

(30) Foreign Application Priority Data

Sep. 23, 2020 (CN) .......................... 202011007316.5

(51) Int. Cl.
*H04L 9/00* (2006.01)
*H04L 29/06* (2006.01)
*G06N 3/04* (2006.01)
*G06N 3/08* (2006.01)

(52) U.S. Cl.
CPC ....... *H04L 63/1425* (2013.01); *G06N 3/0454* (2013.01); *G06N 3/08* (2013.01)

(58) Field of Classification Search
CPC ..... H04L 9/003; H04L 2209/12; H04L 9/302; H04L 9/3066; H04L 9/004; G06F 7/725; G06F 21/72; G06F 2207/7219; G09C 1/00

See application file for complete search history.

(56) References Cited

U.S. PATENT DOCUMENTS

| 2016/0226894 | A1* | 8/2016 | Lee | ............... | H04L 63/1416 |
| 2019/0124045 | A1* | 4/2019 | Zong | ............... | G06N 3/0454 |
| 2019/0260778 | A1* | 8/2019 | Chen | ............... | G06N 7/005 |
| 2020/0285737 | A1* | 9/2020 | Kraus | ............... | H04L 63/1416 |

(Continued)

FOREIGN PATENT DOCUMENTS

| CN | 110825068 A | 2/2020 |
| CN | 110837872 A | 2/2020 |

(Continued)

OTHER PUBLICATIONS

First Office Action issued in counterpart Chinese Patent Application No. 202011007316.5, dated Nov. 19, 2020.

*Primary Examiner* — Beemnet W Dada
(74) *Attorney, Agent, or Firm* — Westbridge IP LLC

(57) ABSTRACT

A few-shot learning based intrusion detection method of an industrial control system, including: dividing an original data set extracted from a data flow of the industrial control system into a detection model training set and a basic model training set; using principal component analysis method to reduce dimension of a continuous data matrix M in the two training sets; using one-hot encoding method to process a discrete data matrix V in the two training sets; using processed basic model training set to construct few-shot training tasks required for basic model training; training a basic model based on convolutional neural networks with help of constructed few-shot training tasks; based on trained basic model, using processed detection model training set for further training to obtain the detection model; effectively detecting attacks in real-time data streams with help of center vectors of three different types of samples in the detection model.

11 Claims, 1 Drawing Sheet

(56) References Cited

U.S. PATENT DOCUMENTS

| | | | | |
|---|---|---|---|---|
| 2020/0334578 A1* | 10/2020 | Ikeda | ................... | G06N 3/0454 |
| 2021/0073630 A1* | 3/2021 | Zhang | ...................... | G06N 3/08 |
| 2021/0126943 A1* | 4/2021 | Roychowdhury | ... | G06K 9/6256 |
| 2021/0150698 A1* | 5/2021 | Chu | ...................... | G06T 7/0004 |

FOREIGN PATENT DOCUMENTS

| CN | 110912867 A | 3/2020 |
|---|---|---|
| CN | 111428789 A | 7/2020 |
| CN | 111431938 A | 7/2020 |
| CN | 111460441 A | 7/2020 |
| CN | 111553381 A | 8/2020 |
| CN | 111553386 A | 8/2020 |

\* cited by examiner

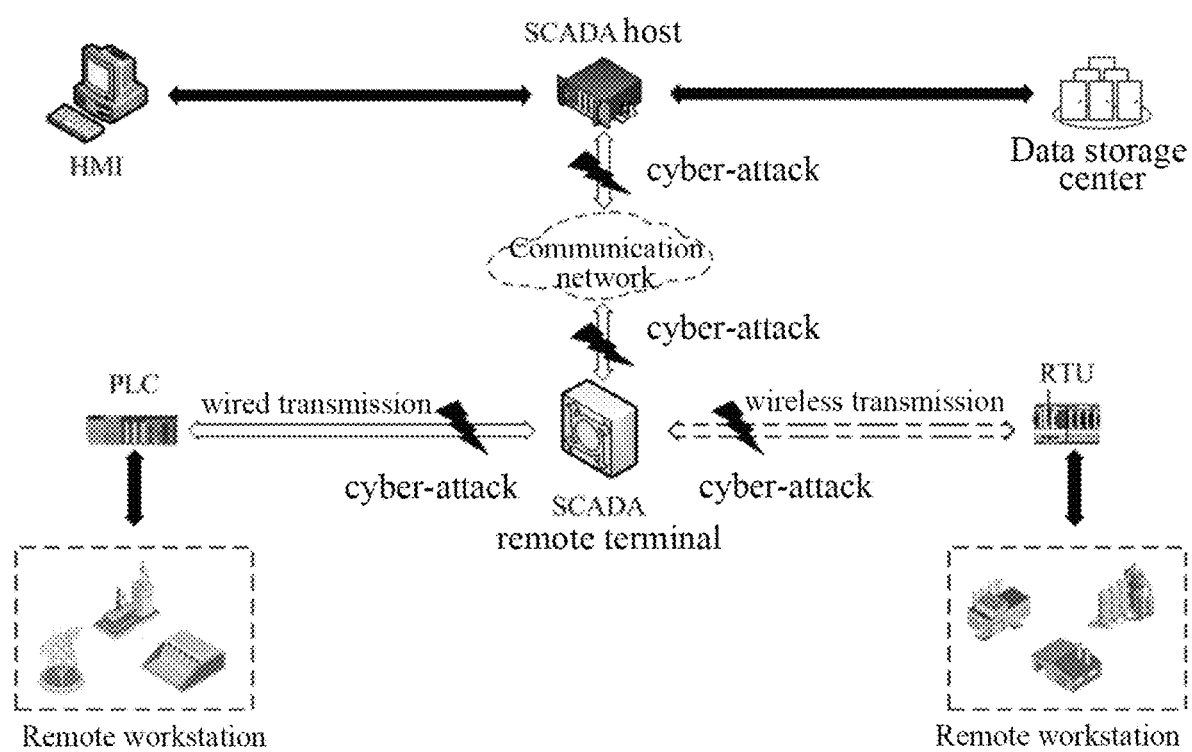

FEW-SHOT LEARNING BASED INTRUSION DETECTION METHOD OF INDUSTRIAL CONTROL SYSTEM

CROSS REFERENCE TO RELATED APPLICATIONS

The present disclosure claims the priority of Chinese Patent Application No. 202011007316.5, filed on Sep. 23, 2020, and entitled "FEW-SHOT LEARNING BASED INTRUSION DETECTION METHOD OF INDUSTRIAL CONTROL SYSTEM", which is hereby incorporated by reference in its entirety.

TECHNICAL FIELD

This disclosure relates to the technical field of intrusion detection for industrial control systems, specifically, to a few-shot learning based intrusion detection method for industrial control systems.

BACKGROUND

The industrial control system is used to support the interconnection and communication among various components in the industrial production process and ensure the stable and orderly operation of the industrial production process. Most of the early industrial production processes only involved the small-scale communication among dedicated hardware, therefore, the traditional industrial control system is naturally closed, in addition to the internal failure of the system, there is no need to worry about large-scale cyber attacks. However, with the development of Internet Information Technology, Information and Communications Technology (ICT), automation, distributed control, wide area monitoring and control, edge computing and other technologies began to be applied to industrial control systems, the gradual integration of traditional industrial control systems and modern information networks has introduced more security threats while improving production efficiency. As industrial control system is widely used in major areas of national such as transportation, electric power, chemical industry, petroleum, metallurgy, the security issue of industrial control system needs to be solved urgently.

The industrial control system connected to the Internet has exposed a wide range of intrusion access points to the outside world, which can be used by attackers to launch different forms of cyber attacks such as denial of service attacks, reconnaissance attacks, malicious command injection attacks, and malicious response injection attacks, and due to the lack of security considerations at the beginning of the design of industrial control systems, it is often difficult to find the above-mentioned cyber threats. At present, a line of related research work have been presented to achieve intrusion detection in industrial control systems through traditional machine learning technology. Before detecting a certain type of attack, the detection method using traditional machine learning technology needs to learn a large number of malicious samples of such attacks in advance. However, there may be some new type cyber attacks with extremely destructive power in industrial control systems, in this case, the detection methods using traditional machine learning techniques tend to be less effective or even ineffective, because the sample size that can be used for machine learning training is extremely small.

The detection methods of traditional machine learning technology have disadvantages as follows:

(1) it requires a long period of training before detecting a specific attack, which is difficult to cope with the real-time changing industrial control system environment;

(2) it can only effectively detect attack types with a large number of malicious samples for training, and it is difficult to detect those attack types with only a small number of samples; and 3) only normal type samples and abnormal type samples can be distinguished, and new type attack samples cannot be further distinguished.

The reasons for the above defects in the detection methods of traditional machine learning technology are as follows:

1. the detection method using traditional machine learning technology needs to be trained by a large number of similar samples to learn the potential features of such attacks, and due to the huge sample size in the training phase, it takes a long time;

2. in order to learn the potential features in the attack data, traditional machine learning methods usually use unimproved deep neural networks, which are more complex in structure; when the sample size is small, traditional machine learning methods often have overfitting, so few-shot attacks cannot be effectively detected; and 3. traditional detection methods do not consider the acquisition of new type attack samples; therefore, it is usually a two-classification model, that is, only normal type samples and abnormal type samples are distinguished, and abnormal type samples are not further classified.

SUMMARY

The object of this disclosure is to provide a few-shot learning based intrusion detection method of an industrial control system, which can effectively classify and detect normal type samples, a certain common type attack samples and new type attack samples. New type attack samples refer to few-shot attack samples, and few-shot attack is a type of cyber attack with only a few examples being available.

This disclosure is achieved by the following technical scheme: a few-shot learning based intrusion detection method of an industrial control system, including:

1) dataset segmentation, dividing three different types of samples of an original data set extracted from a data flow of the industrial control system into a detection model training set and a basic model training set, where the three different types of samples are normal type samples, common type attack samples and new type attack samples;

2) continuous data processing, using a Principal Component Analysis (PCA) method to reduce a dimension of a data matrix M composed of n-dimension continuous features in m data samples of the basic model training set and the detection model training set;

3) discrete data processing, using a one-hot encoding method to process a data matrix V composed of p-dimension discrete features in the m data samples of the basic model training set and the detection model training set;

4) few-shot training task construction, after operation 3), using processed basic model training set to form a support set and a query set, and constructing few-shot training tasks required for basic model training;

5) basic model training, training a basic model based on Convolutional Neural Networks (CNN) with help of constructed few-shot training tasks;

6) detection model training, based on the basic model that has been trained, using the detection model training set processed by operation 3) for further training to obtain the detection model; and 7) real-time data detection, effectively detecting attacks in real-time data streams with help of the center vector of each of the three different types of samples in the detection model.

Further, in order to better achieve this disclosure, the following setting method is particularly adopted: operation 1) includes: dividing the original dataset containing the three different types of samples including a large number of normal samples of a normal type, common type attack samples of at least 3 common attack types and K new type attack samples of a new attack type (K≤20) in the following ways to obtain the detection model training set and the basic model training set:

1.1) respectively extracting K samples from the normal type samples and common type attack samples of a certain common attack type to be detected, and forming the detection model training set together with the K new type attack samples; and 1.2) composing the basic model training set by remaining normal type samples and common type attack samples.

Further, in order to better achieve this disclosure, the following setting method is particularly adopted: operation 2) includes:

2.1) preprocessing the data matrix M composed of the n-dimension continuous features in the m data samples of the basic model training set and the detection model training set by using a z-score standardized method, where a j-th data $z_j^i$ in an i-th column data in the data matrix M is transformed to $x_j^i$ according to equation (1):

$$x_j^i = \frac{z_j^i - z^{-i}}{s^i} \quad (1)$$

where, $z^{-i}$ and $s^i$ represent a mean and standard deviation of the i-th column data, respectively;

2.2) after preprocessing, calculating an optimal eigenmatrix $\hat{D}$ of the data matrix M according to equation (2):

$$\hat{D} = \underset{D}{\mathrm{argmax}} \ D^{-1}WD \quad (2)$$

where, D is an eigenmatrix of the data matrix M, a dimension of D is n×n, W is a covariance matrix of the data matrix M, and a dimension of W is n×n; and 2.3) reducing the data matrix M of a dimension m×n to M' of a dimension m×l according to equation (3):

$$M' = MD_l \quad (3)$$

where a matrix $D_l$ consists of first l-dimension data of the optimal eigenmatrix $\hat{D}$.

Further, in order to better achieve this disclosure, the following setting method is particularly adopted: operation 3) includes: counting a number k of types of discrete values contained in the i-th column data of the data matrix V, assigning k+1 bits encoding to the i-th column data, and encoding a class j discrete value in the i-th column data as a one-hot vector $a^j$ according to equation (4):

$$a_l^j = \begin{cases} 0 & \text{if } l \neq j \\ 1 & \text{if } l = j \end{cases} \quad (4)$$

where $a_l^j$ is an l-th element of the vector $a^j$.

Further, in order to better achieve this disclosure, the following setting method is particularly adopted: when encoding the class j discrete value (j=1, k) in the i-th column data as the one-hot vector $a^j$ according to equation (4), if a new type of discrete value other than the k types of discrete values appears, that is, considering that there may be new types of discrete values that do not appear in the training set during the actual detection phase, in this case, setting (k+1)-th bit of $a^j$ to 1 and the other bits of $a^j$ to 0.

Further, in order to better achieve this disclosure, the following setting method is particularly adopted: operation 4) includes:

4.1) selecting a sample set of the normal type and any two attack types from the basic model training set, and randomly selecting K samples from each type of samples in the sample set without repetition to form the support set required for the basic model training;

4.2) selecting a sample set of the same three types as in operation 4.1) from the basic model training set, and randomly selecting K' samples from each type of samples in the sample set without repetition to form the query set, where K'≥K, which is used to verify the training effect of the basic model;

4.3) combining the support set and the query set in operation 4.1) and operation 4.2) to form a few-shot training task; and 4.4) repeating operation 4.1), operation 4.2), and operation 4.3) N times (N≥100) to construct all the few-shot training tasks required for the basic model training.

Further, in order to better achieve this disclosure, the following setting method is particularly adopted: operation 5) includes:

5.1) initializing an optimal loss value λ to 0;

5.2) initializing a loss value $\lambda_k$ of an $N_k$-th few-shot training task to 0;

5.3) calculating a center vector of each of the three different types of samples according to equation (5), where the three different types of samples are from a support set of the $N_k$-th few-shot training task:

$$m_c = \frac{1}{|K|} \sum_{(x_i,y_i) \in S_c} f_\varphi(x_i) \quad (5)$$

where, $m_c$ represents a center vector of class c samples in this training task, $s_c$ is a set of class c samples in this training task, $x_i$ is an i-th sample vector in $s_c$, $y_i$ is a label corresponding to $x_i$, $f_\varphi$ is an embedding function with a model parameter φ, and the model parameter φ is determined by machine learning;

5.4) using a query set of the $N_k$-th few-shot training task, calculating the loss value $\lambda_k$ of the $N_k$-th few-shot training task according to equation (6):

$$\lambda_k = \sum_{c=1}^{k} \lambda_k^c \quad (6)$$

where, $\lambda_k^c$ is a loss value of the basic model with respect to the class c samples;

5.5) if $N_k$=1 or $\lambda_k$<λ, setting λ to $\lambda_k$ and saving the model parameter at this time for subsequent further training of a detection model; and 5.6) repeating operations 5.2) to 5.5) N times to obtain the basic model.

Further, in order to better implement this disclosure, the following setting method is particularly adopted: the loss value $\lambda_k^c$, of the model with respect to the class c samples is determined by equation (7):

$$\lambda_k^c = \frac{1}{3N_q}[-\log P(y = c \mid x_i; \varphi)] \qquad (7)$$

where $P(y=c|x_i;\varphi)$ is a probability distribution of the sample $x_i$ predicted as the class c under the model parameter $\varphi$, which is determined by equation (8):

$$P(y = c \mid x_i; \varphi) = \frac{\exp(-d(f_\varphi(x_i), m_c))}{\sum_{c'=1}^{k} \exp(-d(f_\varphi(x_i), m_{c'}))} \qquad (8)$$

where, $d(a,b)$ is a distance function between a vector a and a vector b, which is determined by equation (9):

$$d(a,b)\|a-b\|^2 \qquad (9)$$

Further, in order to better achieve this disclosure, the following setting method is particularly adopted: operation 6) includes:

6.1) loading the model parameter $\varphi$;

6.2) respectively calculating the center vectors of the normal type samples, the common type attack samples of a certain common attack type to be detected, and the new type attack samples according to equation (5); and 6.3) saving the center vectors of the three types of samples to obtain the detection model.

Further, in order to better achieve this disclosure, the following setting method is particularly adopted: operation 7) includes:

7.1) intercepting data segments with a same structure as samples in the original dataset from the real-time data stream, and taking the data segments as a detection sample;

7.2) respectively processing continuous data and discrete data in the detection sample by using operation 2) and operation 3);

7.3) loading the model parameter $\varphi$;

7.4) calculating a probability distribution of a prediction type of the detection sample, where a type corresponding to the maximum probability distribution is a model prediction type; and for example, for the detection sample x, the maximum probability distribution $P_{max}(x)$ is calculated as shown in equation (10):

$$P_{max}(x) = \max(P_1(x), P_2(x), P_3(x)) \qquad (10)$$

where max(a,b,c) is the maximum function, its output is the maximum value in a, b, c, $P_i(x)$ is a probability that the detection sample belongs to an i type (here i=1, 2, 3), which is determined by equation (11):

$$P_i(x) = P(y = i \mid x; \varphi) = \frac{\exp(-d(f_\varphi(x), m_i))}{\sum_{i'=1}^{k} \exp(-d(f_\varphi(x), m_{i'}))} \qquad (11)$$

where $m_i$ is the center vector of the i-class sample, which is calculated by equation (5);

7.5) performing further processing according to a prediction result in operation 7.4): if the detection sample is detected as a normal type, allowing data traffic to pass normally; and if the detection sample is detected as an attack type, intercepting the data traffic and sending an alarm.

Compared with the prior art, this disclosure has advantages and beneficial effects as follows:

(1) starting from the shortcomings of the prior art, and considering that the few-shot attack problem that may occur in the actual application scenario of the industrial control system, this disclosure provides a few-shot learning based intrusion detection method of an industrial control system is provided; and (2) this disclosure can solve the above-mentioned 3 existing technical shortcomings, and achieve the effective detection of new type cyber attacks with only K attack samples (K≤20), thereby providing industrial control systems with stronger defense capabilities against new type network intrusions with few-shots.

BRIEF DESCRIPTION OF THE DRAWINGS

FIG. 1 is a typical system model architecture diagram for implementing this disclosure.

DETAILED DESCRIPTION OF THE EMBODIMENTS

Hereinafter, this disclosure will be further described in detail with reference to the embodiments, but the embodiments of this disclosure are not limited thereto.

To make the embodiments of this disclosure clearer in terms of objects, technical solutions and advantages, the technical solutions in the embodiments of this disclosure will be clearly and completely described with reference to the drawings in the embodiments of this disclosure. Obviously, the described embodiments are only a part of the embodiments of this disclosure, but not all of the embodiments. Based on the embodiments of this disclosure, all other embodiments obtained by those of ordinary skill in the art without creative efforts shall fall within the claimed scope of this disclosure. Therefore, the following detailed description of the embodiments of this disclosure provided in the drawings is not intended to limit the scope of this disclosure as claimed, but merely represents selected embodiments of this disclosure. Based on the embodiments of this disclosure, all other embodiments obtained by those of ordinary skill in the art without creative efforts shall fall within the claimed scope of this disclosure.

In the description of this disclosure, it should be understood that the orientation or position relationship indicated by the terms "center", "longitudinal", "transverse", "length", "width", "thickness", "up", "down", "front", "rear", "left", "right", "vertical", "horizontal", "top", "bottom", "inside", "outside", "clockwise", "counterclockwise", etc. is based on the orientation or position relationship shown in the attached FIGURES, which only to facilitate the description of this disclosure and simplify the description, not to indicate or imply that the device or element referred to must have a specific orientation, or be constructed and operated in a specific orientation, therefore, it cannot be understood as a limitation of this disclosure.

In addition, the terms "first" and "second" are only used for description purposes, it cannot be understood as indicating or implying its relative importance or implicitly indicating the number of technical features indicated. Therefore, a feature associated with "first" and "second" may explicitly or implicitly include at least one such feature. In the description of this disclosure, "a plurality of" means at least two, unless otherwise specifically defined.

In this disclosure, unless otherwise clearly specified and limited, the terms "install", "connect", "link", "fix", etc. should be understood in a broad sense. For example, they can be a fixed connection, a detachable connection, or a whole; it can be a mechanical connection or an electrical connection; it can be a direct connection or an indirect connection through an intermediary, and it can be the internal communication between two components or the interaction relationship between two components. For those of ordinary skill in the art, the specific meanings of the above terms in the present disclosure can be understood according to specific circumstances.

In this disclosure, unless otherwise expressly specified and defined, the first feature being "above" or "below" the second feature may include direct contact between the first and second features, it may also be included that the first and second features are not in direct contact but are contacted by additional features therebetween. Moreover, the first feature being "above", "over", and "on" the second feature includes the first feature being directly above and obliquely above the second feature, or merely indicating that the horizontal height of the first feature is higher than that of the second feature. The first feature being "below", "under", and "beneath" the second feature includes the first feature being directly below and obliquely below the second feature, or merely indicating that the horizontal height of the first feature is less than that of the second feature.

Embodiment 1

This disclosure designs a few-shot learning based intrusion detection method of an industrial control system, including:

1) dataset segmentation, dividing three different types of samples of an original data set extracted from a data flow of the industrial control system into a detection model training set and a basic model training set, where the three different types of samples are normal type samples, common type attack samples and new type attack samples;

2) continuous data processing, using a Principal Component Analysis (PCA) method to reduce a dimension of a data matrix M composed of n-dimension continuous features in m data samples of the basic model training set and the detection model training set;

3) discrete data processing, using a one-hot encoding method to process a data matrix V composed of p-dimension discrete features in the m data samples of the basic model training set and the detection model training set;

4) few-shot training task construction, after operation 3), using processed basic model training set to form a support set and a query set, and constructing few-shot training tasks required for basic model training;

5) basic model training, training a basic model based on Convolutional Neural Networks (CNN) with help of constructed few-shot training tasks;

6) detection model training, based on the basic model that has been trained, using the detection model training set processed by operation 3) for further training to obtain the detection model; and 7) real-time data detection, effectively detecting attacks in real-time data streams with help of the center vector of each of the three different types of samples in the detection model.

Embodiment 2

This embodiment is further optimized on the basis of the above embodiments, and the same parts as the foregoing technical solutions will not be repeated here. Further, in order to better achieve this disclosure, the following setting method is particularly adopted: operation 1) includes: dividing the original dataset containing the three different types of samples including a large number of normal samples of a normal type, common type attack samples of at least 3 common attack types and K new type attack samples of a new attack type (K≤20) in the following ways to obtain the detection model training set and the basic model training set:

1.1) respectively extracting K samples from the normal type samples and common type attack samples of a certain common attack type to be detected and forming the detection model training set together with the K new type attack samples; and 1.2) composing the basic model training set by remaining normal type samples and remaining common type attack samples.

Embodiment 3

This embodiment is further optimized on the basis of any of the above embodiments, and the same part as the foregoing technical solution will not be repeated here. Further, in order to better achieve this disclosure, the following setting method is particularly adopted: operation 2) includes:

2.1) preprocessing the data matrix M composed of the n-dimension continuous features in the m data samples of the basic model training set and the detection model training set by using a z-score standardized method, where a j-th data $z_j^i$ in an i-th column data in the data matrix M is transformed to $x_j^i$ according to equation (1):

$$x_j^i = \frac{z_j^i - z^{-i}}{s^i} \quad (1)$$

where, $z^{-i}$ and $s^i$ represent a mean and a standard deviation of the i-th column data, respectively;

2.2) after preprocessing, calculating an optimal eigenmatrix $\hat{D}$ of the data matrix M according to equation (2):

$$\hat{D} = \underset{D}{\operatorname{argmax}} \ D^{-1}WD \quad (2)$$

where, D is an eigenmatrix of the data matrix M, a dimension of D is n×n, W is a covariance matrix of the data matrix M, and a dimension of W is n×n; and 2.3) reducing the data matrix M of a dimension m×n to a M' of a dimension m×l according to equation (3):

$$M' = MD_l \quad (3)$$

where a matrix $D_l$ consists of first l-dimension data of the optimal eigenmatrix $\hat{D}$.

Embodiment 4

This embodiment is further optimized on the basis of any of the above embodiments, and the same part as the foregoing technical solution will not be repeated here. Further, in order to better achieve this disclosure, the following setting method is particularly adopted: operation 3) includes: counting a number k of types of discrete values contained in the i-th column data of the data matrix V, assigning k+1 bits encoding to the i-th column data, and encoding a class j discrete value (j=1, k) in the i-th column data as a one-hot vector $a^j$ according to equation (4):

$$a_l^j = \begin{cases} 0 & \text{if } l \ne j \\ 1 & \text{if } l = j \end{cases}, \quad (4)$$

where $a_l^j$ is an l-th element of the vector $a^j$.

Embodiment 5

This embodiment is further optimized on the basis of any of the above embodiments, and the same part as the foregoing technical solution will not be repeated here. Further, in order to better achieve this disclosure, the following setting method is particularly adopted: when encoding the class j discrete value (j=1, k) in the i-th column data as the one-hot vector according to equation (4), if a new type of discrete value other than the k types of discrete values appears, that is, considering that there may be new types of discrete values that do not appear in the training set during the actual detection phase, in this case, setting (k+1)-th bit of $a^j$ to 1 and the other bits of $a^j$ to 0.

Embodiment 6

This embodiment is further optimized on the basis of any of the above embodiments, and the same part as the foregoing technical solution will not be repeated here. Further, in order to better achieve this disclosure, the following setting method is particularly adopted: operation 4) includes:

4.1) selecting a sample set of the normal type and any two attack types from the basic model training set, and randomly selecting K samples from each type of samples in the sample set without repetition to form the support set required for the basic model training;

4.2) selecting a sample set of the same three types as in operation 4.1) from the basic model training set, and randomly selecting K' samples from each type of samples in the sample set without repetition to form the query set, where, K'≥K; which is used to verify the training effect of the basic model;

4.3) combining the support set and the query set in operation 4.1) and operation 4.2) to form a few-shot training task; and 4.4) repeating operation 4.1), operation 4.2), and operation 4.3) N times (N≥100) to construct all the few-shot training tasks required for the basic model training.

Embodiment 7

This embodiment is further optimized on the basis of any of the above embodiments, and the same part as the foregoing technical solution will not be repeated here. Further, in order to better achieve this disclosure, the following setting method is particularly adopted: operation 5) includes:

5.1) initializing an optimal loss value λ to 0;
5.2) initializing a loss value $\lambda_k$ of an $N_k$-th few-shot training task to 0;

5.3) calculating a center vector of each of the three different types of samples according to equation (5), where the three different types of samples are from a support set of the $N_k$-th few-shot training task:

$$m_c = \frac{1}{|K|} \sum_{(x_i, y_i) \in S_c} f_\varphi(x_i) \quad (5)$$

where, $m_c$ represents a center vector of class c samples in this training task, $s_c$ is a set of class c samples in this training task, $x_i$ is an i-th sample vector in $s_c$, $y_i$ is a label corresponding to $x_i$, $f_\varphi$ is an embedding function with a model parameter φ, and the model parameter φ is determined by machine learning;

5.4) using a query set of the $N_k$-th few-shot training task, calculating the loss value $\lambda_k$ of the $N_k$-th few-shot training task according to equation (6):

$$\lambda_k = \sum_{c=1}^{k} \lambda_k^c \quad (6)$$

where, $\lambda_k^c$ is a loss value of the basic model with respect to the class c samples;

5.5) if $N_k$=1 or $\lambda_k<\lambda$, setting λ to $\lambda_k$ and saving the model parameter φ at this time for subsequent further training of a detection model; and 5.6) repeating operations 5.2) to 5.5) N times to obtain a basic model.

Embodiment 8

This embodiment is further optimized on the basis of any of the above embodiments, and the same part as the foregoing technical solution will not be repeated here. Further, in order to better achieve this disclosure, the following setting method is particularly adopted: the loss value $\lambda_k^c$ of the model with respect to the class c samples is determined by equation (7):

$$\lambda_k^c = \frac{1}{3N_q}[-\log P(y = c|x_i; \varphi)]| \quad (7)$$

where P(y=c|$x_i$;φ) is a probability distribution of the sample $x_i$ predicted as the class c under the model parameter φ, which is determined by equation (8):

$$P(y = c \mid x_i; \varphi) = \frac{\exp(-d(f_\varphi(x_i), m_c))}{\sum_{c'=1}^{k} \exp(-d(f_\varphi(x_i), m_{c'}))} \quad (8)$$

where, d(a,b) is a distance function between a vector a and a vector b, which is determined by equation (9):

$$d(a,b)\|a-b\|^2 \quad (9)$$

Embodiment 9

This embodiment is further optimized on the basis of any of the above embodiments, and the same part as the foregoing technical solution will not be repeated here. Further, in order to better achieve this disclosure, the following setting method is particularly adopted: operation 6) includes:

6.1) loading the model parameter $\varphi$;

6.2) respectively calculating the center vectors of the normal type samples, the common type attack samples of a certain common attack type to be detected, and the new type attack samples according to equation (5); and 6.3) saving the center vectors of the three types of samples to obtain the detection model.

Embodiment 10

This embodiment is further optimized on the basis of any of the above embodiments, and the same part as the foregoing technical solution will not be repeated here. Further, in order to better achieve this disclosure, the following setting method is particularly adopted: operation 7) includes:

7.1) intercepting data segments with a same structure as samples in the original dataset from the real-time data stream, and taking the data segments as a detection sample;

7.2) respectively processing continuous data and discrete data in the detection sample by using operation 2) and operation 3);

7.3) loading the model parameter $\varphi$;

7.4) calculating a probability distribution of a prediction type of the detection sample, where a type corresponding to the maximum probability distribution is a model prediction type; and for example, for the detection sample x, the maximum probability distribution $P_{max}(x)$ is calculated as shown in equation (10):

$$P_{max}(x) = \max(P_1(x), P_2(x), P_3(x)) \qquad (10)$$

where max(a,b,c) is the maximum function, its output is the maximum value in a, b, c, $P_i(x)$ is a probability that the detection sample belongs to an i type (here i=1, 2, 3), which is determined by equation (11):

$$P_i(x) = P(y = i \mid x; \varphi) = \frac{\exp(-d(f_\varphi(x), m_i))}{\sum_{i'=1}^{k} \exp(-d(f_\varphi(x), m_{i'}))} \qquad (11)$$

where $m_i$ is the center vector of the i-class sample, calculated by equation (5);

7.5) performing further processing according to a prediction result in operation 7.4): if the detection sample is detected as a normal type, allowing data traffic to pass normally; and if the detection sample is detected as an attack type, intercepting the data traffic and sending an alarm.

Embodiment 11

As shown in FIG. 1, a typical system model configured to implement a few-shot learning based intrusion detection method of an industrial control system is set as follows:

Human Machine Interface (HMI): the medium of interaction between the system model and the operator. The information fed back by Supervisory Control and Data Acquisition (SCADA) host is displayed to the operator through HMI, the operator makes a judgment according to the feedback information, and then issues the corresponding control command to the SCADA host through HMI.

SCADA host: on the one hand, responsible for collecting the data reported by the SCADA remote terminal and delivering the data to the data storage center for safe storage; on the other hand, responsible for sending control commands from the operator to the SCADA remote terminal.

Data storage center: responsible for secure access to data delivered by the SCADA host.

SCADA remote terminal: on the one hand, connected to Programmable Logic Controller (PLC) and Remote Terminal Unit (RTU) and responsible for receiving data and transmitting control commands from the SCADA host. On the other hand, connected to the SCADA host through the wide area network and is responsible for reporting data and receiving control commands.

PLC: connected to the sensors and actuators in the production equipment of the remote workstation, and connected to the SCADA remote terminal through a wired connection. On the one hand, responsible for monitoring and reporting the working status of sensors and actuators; on the other hand, responsible for executing the control commands sent by the SCADA remote terminal.

RTU: connected to the sensors and actuators in the production equipment of the remote workstation, and connected to the SCADA remote terminal through a wireless connection. Similar to PLC function, responsible for monitoring and reporting the working status of sensors and actuators, and executing logical control commands.

Remote workstation: referring to industrial infrastructure such as factories, power stations, substations, offshore drilling platforms, etc. Each remote workstation contains multiple industrial production equipment with sensors and actuators and is directly connected to PLC or RTU by hard wiring.

Based on the system model, a few-shot learning based intrusion detection method of an industrial control system, including:

1) dataset division, acquiring an original dataset containing three different types of samples including a large number of normal samples of a normal type, common type attack samples of at least 3 common attack types and K new type attack samples (K≤20) of a new attack type from historical data in a data storage center, the original dataset is then divided into a detection model training set and a basic model training set in the following ways:

1.1) respectively extracting K samples from the normal type samples and common type attack samples of a certain common attack type to be detected and forming the detection model training set together with the K new type attack samples; and 1.2) composing the basic model training set by remaining normal type samples and remaining common type attack samples.

2) continuous data processing, including:

2.1) preprocessing the data matrix M composed of the n-dimension continuous features in the m data samples of the basic model training set and the detection model training set by using a z-score standardized method, where a j-th data $z_j^i$ in an i-th column data in the data matrix M is transformed to $x_j^i$ according to equation (1):

$$x_j^i = \frac{z_j^i - z^{-i}}{s^i} \qquad (1)$$

where, $z^{-i}$ and $s^i$ represent a mean and a standard deviation of the i-th column data, respectively;

2.2) after preprocessing, calculating an optimal eigenmatrix $\hat{D}$ of the data matrix M according to equation (2):

$$\hat{D} = \underset{D}{\text{argmax}} \ D^{-1}WD \quad (2)$$

where, D is an eigenmatrix of the data matrix M, a dimension of D is n×n, W is a covariance matrix of the data matrix M, and a dimension of W is n×n; and 2.3) reducing the data matrix M of a dimension m×n to a M' of a dimension m×l according to equation (3):

$$M' = MD_l \quad (3)$$

where a matrix $D_l$ consists of first l-dimension data of the optimal eigenmatrix $\hat{D}$.

3) discrete data processing, using a one-hot encoding method to process a data matrix V composed of p-dimension discrete features in the m data samples of the basic model training set and the detection model training set; Specifically: counting a number k of types of discrete values contained in the i-th column data of the data matrix V, assigning k+1 bits encoding to the i-th column data, and encoding a class j discrete value (j=1, 2, ..., k) in the i-th column data as a one-hot vector $a^j$ according to equation (4):

$$a_l^j = \begin{cases} 0 & \text{if } l \neq j \\ 1 & \text{if } l = j \end{cases} \quad (4)$$

where $a_i^j$ is an l-th element of the vector $a^j$. Considering that there may be new types of discrete values that do not appear in the training set during the actual detection phase, that is, if there is a new type of discrete value other than the k types of discrete values, in this case, setting (k+1)-th bit of $a^j$ to 1 and the other bits of $a^j$ to 0.

4) few-shot training task construction, including:

4.1) selecting a sample set of the normal type and any two attack types from the basic model training set, and randomly selecting K samples from each type of samples in the sample set without repetition to form the support set required for the basic model training;

4.2) selecting a sample set of the same three types as in operation 4.1) from the basic model training set, and randomly selecting K' samples from each type of samples in the sample set without repetition to form the query set, where K'≥K; which is used to verify the training effect of the basic model;

4.3) combining the support set and the query set in operation 4.1) and operation 4.2) to form a few-shot training task; and 4.4) repeating operation 4.1), operation 4.2), and operation 4.3) N times (N≥100) to construct all the few-shot training tasks required for the basic model training.

5) basic model training, training a basic model based on Convolutional Neural Networks (CNN) with help of constructed few-shot training tasks, including:

5.1) initializing an optimal loss value λ to 0;

5.2) initializing a loss value $\Delta_k$ of an $N_k$-th few-shot training task to 0;

5.3) calculating a center vector of each of the three different types of samples according to equation (5), where the three different types of samples are from a support set of the $N_k$-th few-shot training task:

$$m_c = \frac{1}{|K|} \sum_{(x_i, y_i) \in S_c} f_\varphi(x_i) \quad (5)$$

where, $m_c$ represents a center vector of class c samples in this training task, $s_c$ is a set of class c samples in this training task, $x_i$ is an i-th sample vector in $s_c$, $y_i$ is a label corresponding to the sample vector $x_i$, $f_\varphi$ is an embedding function with a model parameter φ, and the model parameter φ is determined by machine learning;

5.4) using a query set of the $N_k$-th few-shot training task, calculating the loss value $\lambda_k$ of the $N_k$-th few-shot training task according to equation (6):

$$\lambda_k = \sum_{c=1}^{k} \lambda_k^c \quad (6)$$

where, $\lambda_k^c$ is a loss value of the basic model with respect to the class c samples;

5.5) if $N_k=1$ or $\lambda_k<\lambda$, setting λ to $\lambda_k$ and saving the model parameter φ at this time for subsequent further training of a detection model; and 5.6) repeating operations 5.2) to 5.5) N times to obtain a basic model.

6) detection model training, based on the basic model that has been trained, using the detection model training set processed by operation 3) for further training to obtain the detection model, and deploying it to the SCADA host, including:

6.1) loading the model parameter φ;

6.2) respectively calculating the center vectors of the normal type samples, the common type attack samples of a certain common attack type to be detected, and the new type attack samples according to equation (5); and 6.3) saving the center vectors of the three types of samples to obtain the detection model, and deploying it to the SCADA host.

7) real-time data detection, effectively detecting attacks in real-time data streams with help of the center vector of each of the three different types of samples in the detection model, including:

7.1) reporting, by PLC/RTU the real-time data reported by the remote workstation to the SCADA remote terminal through wired/wireless mode. Further, reporting, by the SCADA remote terminal the real-time data to the SCADA host through the wide area network, and intercepting, by the SCADA host data segments with a same structure as samples in the original dataset from the real-time data stream, and taking the data segments as a detection sample;

7.2) respectively processing continuous data and discrete data in the detection sample by using operation 2) and operation 3);

7.3) loading the model parameter φ;

7.4) with the help of the three center vectors in the detection model, calculating, by the SCADA host a probability distribution of a prediction type of the detection sample, where a type corresponding to the maximum probability distribution is a model prediction type; for example, for the detection sample x, the maximum probability distribution $P_{max}(x)$ is calculated as shown in equation (10):

$$P_{max}(x) = \max(P_1(x), P_2(x), P_3(x)) \tag{10}$$

where max(a,b,c) is the maximum function, its output is the maximum value in a, b, c, $P_i(x)$ is a probability that the detection sample belongs to an i type (here i=1, 2, 3), which is determined by equation (11):

$$P_i(x) = P(y = i \mid x; \varphi) = \frac{\exp(-d(f_\varphi(x), m_i))}{\sum_{i'=1}^{k} \exp(-d(f_\varphi(x), m_{i'}))} \tag{11}$$

where $m_i$ is the center vector of the i-class sample, calculated by equation (5);

7.5) performing further processing by the SCADA host according to a prediction result in operation 7.4): if the detection sample is detected as a normal type, normally delivering the data traffic to the data storage center; and if the detection sample is detected as an attack type, intercepting the data traffic and sending an alarm to the HMI.

The above are only preferred embodiments of this disclosure, and does not limit this disclosure in any form. Any simple modification to the above embodiments and equivalent changes according to the technical essence of this disclosure shall fall within the claimed scope of this disclosure.

What is claimed is:

1. A few-shot learning based intrusion detection method of an industrial control system, comprising:

1) dataset segmentation, dividing three different types of samples of an original data set extracted from a data flow of the industrial control system into a detection model training set and a basic model training set, wherein the three different types of samples are normal type samples, common type attack samples and new type attack samples;

2) continuous data processing, using a principal component analysis method to reduce a dimension of a data matrix M composed of n-dimension continuous features in m data samples of the basic model training set and the detection model training set;

3) discrete data processing, using a one-hot encoding method to process a data matrix V composed of p-dimension discrete features in the m data samples of the basic model training set and the detection model training set;

4) few-shot training task construction, after operation 3), using processed basic model training set to form a support set and a query set, and constructing few-shot training tasks required for basic model training;

5) basic model training, training a basic model based on convolutional neural networks with help of constructed few-shot training tasks; comprising:

5.1) initializing an optimal loss value λ to 0;

5.2) initializing a loss value $\lambda_k$ of an $N_k$-th few-shot training task to 0;

5.3) calculating a center vector of each of the three different types of samples according to equation (5), where the three different types of samples are from a support set of the $N_k$-th few-shot training task:

$$m_c = \frac{1}{|K|} \sum_{(x_i, y_i) \in S_c} f_\varphi(x_i) \tag{5}$$

where, $m_c$ represents a center vector of class c samples in this training task, $s_c$ is a set of class c samples in this training task, $x_i$ is an i-th sample vector in $s_c$, $y_i$ is a label corresponding to the sample vector $x_i$, $f_\varphi$ is an embedding function with a model parameter φ, and the model parameter φ is determined by machine learning;

5.4) using a query set of the $N_k$-th few-shot training task, calculating the loss value $\lambda_k$ of the $N_k$-th few-shot training task according to equation (6):

$$\lambda_k = \sum_{c=1}^{k} \lambda_k^c \tag{6}$$

where, $\lambda_k^c$ is a loss value of the basic model with respect to the class c samples;

5.5) if $N_k=1$ or $\lambda_k<\lambda$, setting λ to $\lambda_k$ and saving the model parameter φ at this time for subsequent further training of a detection model; and 5.6) repeating operations 5.2) to 5.5) N times to obtain the basic model;

6) detection model training, based on the basic model that has been trained, using the detection model training set processed by operation 3) for further training to obtain the detection model; and 7) real-time data detection, effectively detecting attacks in real-time data streams with help of the center vector of each of the three different types of samples in the detection model.

2. The method of claim 1, wherein operation 1) comprises: dividing the original dataset in the following ways to obtain the detection model training set and the basic model training set, wherein the original dataset contains the three different types of samples comprising a large number of normal samples of a normal type, common type attack samples of at least 3 common attack types and K new type attack samples of a new attack type:

1.1) respectively extracting K samples from the normal type samples and common type attack samples of a certain common attack type to be detected and forming the detection model training set together with the K new type attack samples; and 1.2) composing the basic model training set by remaining normal type samples and remaining common type attack samples.

3. The method of claim 1, wherein operation 2) comprises:

2.1) preprocessing the data matrix M composed of the n-dimension continuous features in the m data samples of the basic model training set and the detection model training set by using a z-score standardized method, wherein a j-th data $z_j^i$ in an i-th column data in the data matrix M is transformed to $x_j^i$ according to equation (1):

$$x_j^i = \frac{z_j^i - z^{-i}}{s^i} \qquad (1)$$

where, $z^{-i}$ and $s^i$ represent a mean and a standard deviation of the i-th column data, respectively;

2.2) after preprocessing, calculating an optimal eigenmatrix $\hat{D}$ of the data matrix M according to equation (2):

$$\hat{D} = \underset{D}{\mathrm{argmax}}\ D^{-1}WD \qquad (2)$$

where, D is an eigenmatrix of the data matrix M, a dimension of D is n×n, W is a covariance matrix of the data matrix M, and a dimension of W is n×n; and 2.3) reducing the data matrix M of a dimension m×n to a M' of a dimension m×l according to equation (3):

$$M' = MD_l \qquad (3)$$

where a matrix $D_l$ consists of first l-dimension data of the optimal eigenmatrix $\hat{D}$.

4. The method of claim 1, wherein operation 3) comprises: counting a number k of types of discrete values contained in the i-th column data of the data matrix V, assigning k+1 bits encoding to the i-th column data, and encoding a class j discrete value in the i-th column data as a one-hot vector $a^j$ according to equation (4):

$$a_l^j = \begin{cases} 0 & \text{if } l \neq j \\ 1 & \text{if } l = j \end{cases}, \qquad (4)$$

where $a_l^j$ is an l-th element of the vector $a^j$.

5. The method of claim 4, wherein when encoding the class j discrete value in the i-th column data as the one-hot vector $a^j$ according to equation (4), if a new type of discrete value other than the k types of discrete values appears, setting (k+1)-th bit of $a^j$ to 1 and the other bits of $a^j$ to 0.

6. The method of claim 2, wherein operation 4) comprises:
4.1) selecting a sample set of the normal type and any two attack types from the basic model training set, and randomly selecting K samples from each type of samples in the sample set without repetition to form the support set required for the basic model training;
4.2) selecting a sample set of the same three types as in operation 4.1) from the basic model training set, and randomly selecting K' samples from each type of samples in the sample set without repetition to form the query set, where, K'≥K;
4.3) combining the support set and the query set in operation 4.1) and operation 4.2) to form a few-shot training task; and
4.4) repeating operation 4.1), operation 4.2), and operation 4.3) N times to construct all the few-shot training tasks required for the basic model training.

7. The method of claim 1, wherein the loss value $\lambda_k^c$ of the model with respect to the class c samples is determined by equation (7):

$$\lambda_k^c = \frac{1}{3N_q}[-\log P(y = c|x_i; \varphi)] \qquad (7)$$

where $P(y=c|x_i;\varphi)$ is a probability distribution of the sample $x_i$ predicted as the class c under the model parameter $\varphi$, which is determined by equation (8):

$$P(y = c \mid x_i; \varphi) = \frac{\exp(-d(f_\varphi(x_i), m_c))}{\sum_{c'=1}^{k} \exp(-d(f_\varphi(x_i), m_{c'}))} \qquad (8)$$

where, d(a,b) is a distance function between a vector a and a vector b, which is determined by equation (9):

$$d(a,b) = \|a-b\|^2 \qquad (9).$$

8. The method of claim 1, wherein operation 6) comprises:
6.1) loading the model parameter $\varphi$;
6.2) respectively calculating the center vectors of the normal type samples, the common type attack samples of a certain common attack type to be detected, and the new type attack samples according to equation (5); and
6.3) saving the center vectors of the three types of samples to obtain the detection model.

9. The method of claim 7, wherein operation 6) comprises:
6.1) loading the model parameter $\varphi$;
6.2) respectively calculating the center vectors of the normal type samples, the common type attack samples of a certain common attack type to be detected, and the new type attack samples according to equation (5); and
6.3) saving the center vectors of the three types of samples to obtain the detection model.

10. The method of claim 1, wherein operation 7) comprises:
7.1) intercepting data segments with a same structure as samples in the original dataset from the real-time data stream, and taking the data segments as a detection sample;
7.2) respectively processing continuous data and discrete data in the detection sample by using operation 2) and operation 3);
7.3) loading the model parameter;
7.4) calculating a probability distribution of a prediction type of the detection sample, wherein a type corresponding to the maximum probability distribution is a model prediction type; and
7.5) performing further processing according to a prediction result in operation 7.4): if the detection sample is detected as a normal type, allowing data traffic to pass normally; and if the detection sample is detected as an attack type, intercepting the data traffic and sending an alarm.

11. The method of claim 7, wherein operation 7) comprises:
7.1) intercepting data segments with a same structure as samples in the original dataset from the real-time data stream, and taking the data segments as a detection sample;

7.2) respectively processing continuous data and discrete data in the detection sample by using operation 2) and operation 3);
7.3) loading the model parameter $\varphi$;
7.4) calculating a probability distribution of a prediction type of the detection sample, wherein a type corresponding to the maximum probability distribution is a model prediction type; and
7.5) performing further processing according to a prediction result in operation 7.4): if the detection sample is detected as a normal type, allowing data traffic to pass normally; and if the detection sample is detected as an attack type, intercepting the data traffic and sending an alarm.

* * * * *